US011307902B1

United States Patent
Venkitachalam et al.

(10) Patent No.: US 11,307,902 B1
(45) Date of Patent: Apr. 19, 2022

(54) PREVENTING DEPLOYMENT FAILURES OF INFORMATION TECHNOLOGY WORKLOADS

(71) Applicant: KYNDRYL, INC., New York, NY (US)

(72) Inventors: Hariharan N. Venkitachalam, Bengaluru (IN); Harish Bhatt, Bangalore (IN); Amit Merchant, Bangalore (IN); Prashant Pareek, Bangalore (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/037,735

(22) Filed: Sep. 30, 2020

(51) Int. Cl.
*G06F 9/50* (2006.01)
*G06F 11/34* (2006.01)

(52) U.S. Cl.
CPC .......... *G06F 9/505* (2013.01); *G06F 11/3409* (2013.01); *G06F 2209/5022* (2013.01)

(58) Field of Classification Search
CPC ................ G06F 9/505; G06F 11/3409; G06F 2209/5022; H04L 41/0806
See application file for complete search history.

(56) References Cited

U.S. PATENT DOCUMENTS

| | | | | |
|---|---|---|---|---|
| 8,286,176 B1* | 10/2012 | Baumback | ............ | G06F 9/5061 709/221 |
| 9,600,311 B2* | 3/2017 | Fujiwaka | .............. | G06F 9/5088 |
| 10,462,026 B1* | 10/2019 | Zhang | ..................... | H04L 43/08 |
| 10,558,445 B2 | 2/2020 | Cillis | | |
| 2004/0220792 A1* | 11/2004 | Gallanis | ..................... | G06F 8/77 714/E11.197 |
| 2006/0026179 A1* | 2/2006 | Brown | ................... | G06F 16/217 |
| 2006/0184939 A1* | 8/2006 | Sahoo | ...................... | G06F 9/505 718/100 |
| 2006/0248522 A1 | 11/2006 | Lakshminarayanan | | |
| 2010/0205607 A1* | 8/2010 | Shivanna | ............ | G06F 11/0715 718/103 |
| 2012/0173708 A1* | 7/2012 | Bartfai-Walcott | .... | G06F 9/5072 709/224 |

(Continued)

FOREIGN PATENT DOCUMENTS

| | | |
|---|---|---|
| CN | 105051693 A | 11/2015 |
| EP | 3591522 A1 | 1/2020 |

OTHER PUBLICATIONS

Anonymous, "A resource score based method to provision virtual machines in a cloud system," IP.com, Disclosure No. IPCOM000220185D, Jul. 25, 2012, 3 pages, <https://ip.com/IPCOM/000220185>.

(Continued)

*Primary Examiner* — Benjamin C Wu
(74) *Attorney, Agent, or Firm* — Ken Han; Andrew M. Calderon; Roberts Calderon Safran & Cole, P.C.

(57) ABSTRACT

A method for orchestrating a provisioning of a computer workload includes determining characteristics of a computing pattern, determining health data of a computing environment based on the characteristics of the computing pattern, determining a confidence score based on the health data, and determining whether to proceed with provisioning the computer workload based on the confidence score.

21 Claims, 12 Drawing Sheets

(56) References Cited

U.S. PATENT DOCUMENTS

| | | | |
|---|---|---|---|
| 2013/0312005 A1* | 11/2013 | Chiu | G06F 3/0685 |
| | | | 718/105 |
| 2014/0047095 A1* | 2/2014 | Breternitz | G06F 9/5072 |
| | | | 709/224 |
| 2014/0047341 A1* | 2/2014 | Breternitz | G06F 16/23 |
| | | | 715/735 |
| 2015/0026108 A1* | 1/2015 | Portegys | H04L 67/1002 |
| | | | 706/21 |
| 2015/0058467 A1 | 2/2015 | Douglas | |
| 2016/0179560 A1* | 6/2016 | Ganguli | G06F 9/5072 |
| | | | 718/1 |
| 2016/0202962 A1 | 7/2016 | Arif | |
| 2017/0199752 A1* | 7/2017 | Cao | G06F 9/45558 |
| 2018/0024867 A1* | 1/2018 | Gilsdorf | H04L 43/0894 |
| | | | 709/226 |
| 2018/0159721 A1 | 6/2018 | Delcheva | |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

Written Opinion of the International Searching Authority issued in International Application No. PCT/CN2021/120227 dated Nov. 29, 2021, 4 pages.

\* cited by examiner

PREVENTING DEPLOYMENT FAILURES OF INFORMATION TECHNOLOGY WORKLOADS

BACKGROUND

The present invention relates to computing environment creation and maintenance, and more specifically, to preventing deployment failures of information technology ("IT") workloads.

Traditionally, enterprises follow a standard process for provisioning and de-provisioning of the enterprise's IT assets in a hybrid multi-cloud environment. Often these activities are encapsulated as a computing pattern, which is a repeatable piece of automation that defines either a single application installation or a deployment of multiple integrated applications deployed across hybrid multi-cloud environment. Patterns can be deployed on cloud infrastructure to build and configure a standard solution, and patterns can help the enterprise in terms of repeatability, consistency, reliability, labor, and cost. However, an enterprise can have a large eco-system of system management, monitoring, security, and compliance requirements, so patterns can get increasingly complex over time, which can introduce automation errors.

SUMMARY

According to an embodiment of the present disclosure, a method for orchestrating a provisioning of a computer workload includes determining characteristics of a computing pattern, determining health data of a computing environment based on the characteristics of the computing pattern, determining a confidence score based on the health data, and determining whether to proceed with provisioning the computer workload based on the confidence score.

According to an embodiment of the present disclosure, a method for generating a confidence score for a provisioning a computer workload includes receiving heath parameters of components in a computing environment to monitor, receiving threshold and weightage data related to the health parameters, checking the health parameters to gather health data, and storing the health data in a database. The method also includes receiving a request for a confidence score, retrieving the health data in response to receiving the request for the confidence score, scoring each element of the health data individually using the threshold and weightage data, and generating an overall confidence score based on the scoring of each element of the health data.

According to an embodiment of the present disclosure, a system for provisioning a computer workload includes an orchestrator module, a pattern characteristics module, a configuration data module, and a pattern confidence module. The orchestrator module is configured to use a computer pattern to provision the computer workload in a computing environment. The pattern characteristics module is configured to determine which characteristics of the computing environment are relevant to the computer workload. The configuration data module includes threshold and weightage data of the characteristics that are relevant to the computer workload. The pattern confidence score module is configured to calculate a confidence score based on a health of the computing environment and the threshold and weightage data with respect to the characteristics that are relevant to the computer workload. The orchestrator module decides whether to proceed with the provisioning of the workload based on the pattern confidence score.

DETAILED DESCRIPTION

Pattern orchestration can comprise a collection of scripts, images, and/or workflows to provision a virtual machine ("VM"), a VM service, a non-operating-system-based device (e.g., a virtual appliance), or another type of workload with necessary tooling integrations. Each step in the orchestration pattern has a specific purpose, and in some cases, failure of a step in the orchestration can cause all of the provisioning to be rolled back. These failures in provisioning can be due to, for example, network issues, operation services tool server issues, infrastructure issues (e.g., insufficient storage), license issues, etc. In addition, these failures can occur at any stage of provisioning, and some patterns can be very complex (e.g., thirty-five unique tasks and seventeen integrations) and can take hours to perform.

While traditional handling of provisioning can handle trivial failures (e.g., retrying communication in case of a transient network connection loss), in general, non-trivial failures can result in (1) rollback of the entire pattern, including deprovisioning of a virtual machine and its associated resources, (2) loss of time by the end user as they wait for the pattern to be attempted again, (3) loss of productivity since multiple teams can be involved with the troubleshooting of the failure and fixing the problems can include the use of automation, tools, infrastructure, etc., and (4) a negative quality-of-service perception on behalf of the user (especially if provisioning failures occur frequently).

Figure 1:
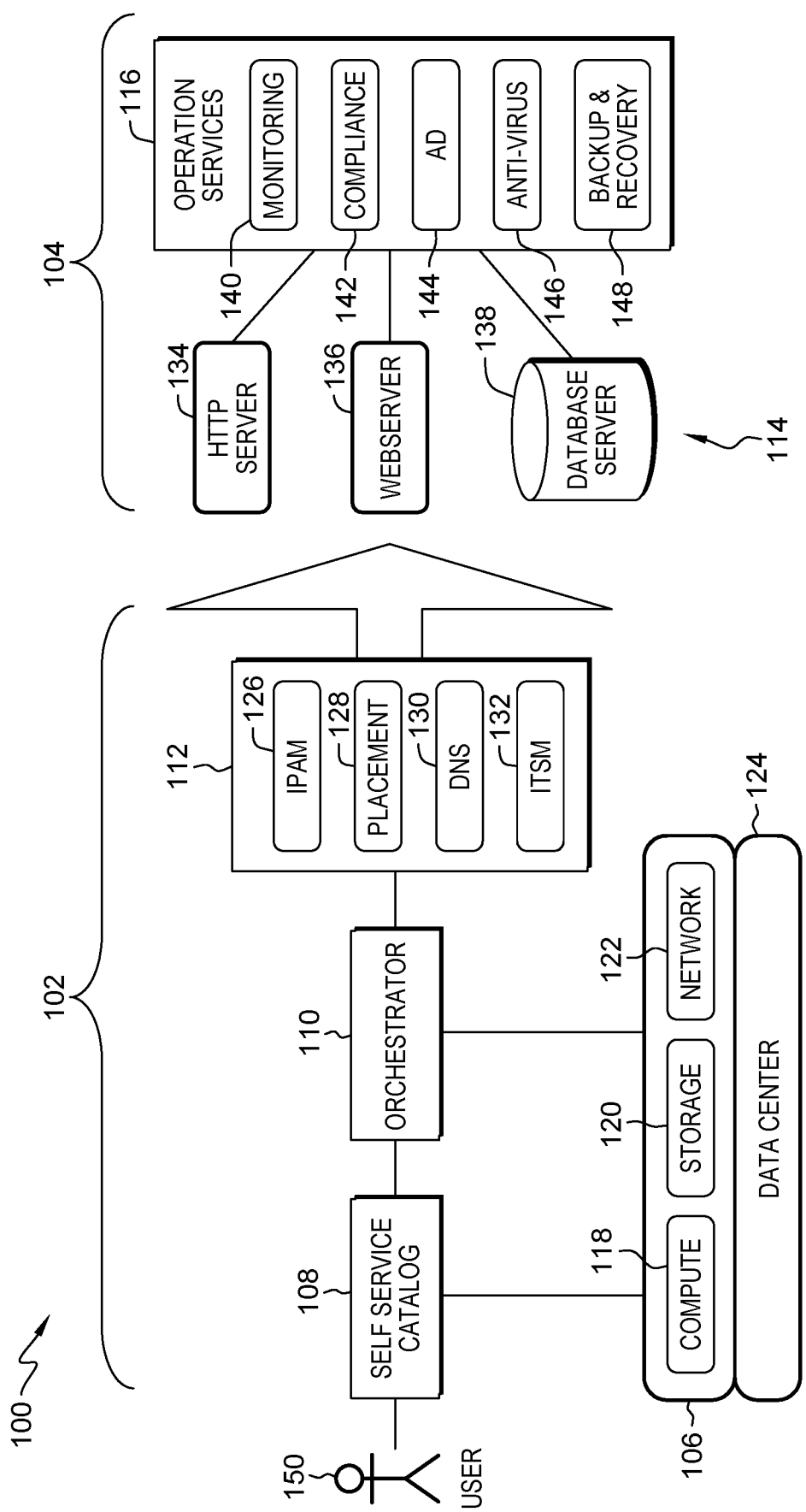
FIG. 1 shows a schematic view of a computing environment architecture that can provision a complex multi-tier pattern, in accordance with an embodiment of the present disclosure.

FIG. 1 depicts provisioning of a complex multi-tier pattern in computing environment 100. Computing environment 100 comprises placement side 102 and consumption side 104. Placement side 102 comprises cloud infrastructure 106, self-service catalog 108, orchestrator 110, and integration tools 112. Consumption side 104 comprises multi-tier servers 114 and operation services tools 116. In the illustrated embodiment, cloud infrastructure 106 comprises compute module 118, storage module 120, network module 122, and data center module 124; integration tools 112 comprises internet protocol address management ("IPAM") module 126, placement module 128, domain name system ("DNS") module 130, and information technology service management ("ITSM") module 132; multi-tier servers 114 comprises hypertext transfer protocol ("HTTP") server 134 in an Internet-facing zone, web server 136 in a perimeter or border network (sometimes referred to as a demilitarized zone ("DMZ")), and database server 138 in a private intranet; and operation services tools 116 comprises monitoring module 140, compliance module 142, active directory ("AD") module 144, anti-virus module 146, and backup/recovery module 148. While FIG. 1 depicts various elements of computing environment 100, there can be greater, fewer, and/or different elements present.

User 150 can interact with placement side 102 which creates a device (or workload), such as a VM (not shown), that operates in consumption side 104. More specifically, user 150 selects a device in self-service catalog 108, which is a list of devices from cloud infrastructure 106 that can be provisioned for the consumption of user 150. Once a device is selected, a provisioning request is forwarded to orchestrator 110 by self-service catalog 108. Orchestrator 110 uses automated logic in conjunction with cloud infrastructure 106 and integration tools 112 to provision the selected device and place it in multi-tier servers 114. Thereby, the device can use operation services tools 116 during its use/consumption by user 150.

As an example, during the deployment of three VMs, there are multiple possible failure scenarios in the aforementioned complex patterns, such as (1) network connectivity issues between any of HTTP server 134, web server 136, and database server 138, (2) failures connect to some of operation services tools 116 (e.g., backup/recovery module 148), (3) insufficient infrastructure resources in cloud infrastructure 106 (e.g., compute module 118, storage module 120, network module 122, and data center module 124), (4) failures of integration tools 112 (e.g., ITSM module 132 not being able to register all three VM requests due to a temporary issue), and (5) other lack of resources (e.g., no free internet protocol ("IP") addresses available in any of multi-tier servers 114). Any of these failures could cause the rollback of the entire pattern even though some of the three VMs have been successfully provisioned.

Therefore, in some embodiments of the present disclosure, a method can be used to preempt conditions that could result in a deployment failure of a pattern. The method can use operations-driven insights and allow orchestrator 110 to intelligently perform the orchestration steps to the extent possible based on the provided pattern's characteristics. In some embodiments of the present disclosure, a method can identify a pattern's characteristics and gather insights from heterogeneous data source systems and services of computing environment 100 that hold operational data related to the functioning of the relevant services. In some embodiments, a method can involve a feedback loop based on each pattern to determine the extent to which the operational data should to be gathered and/or analyzed as to optimize the processing further.

Figure 2:
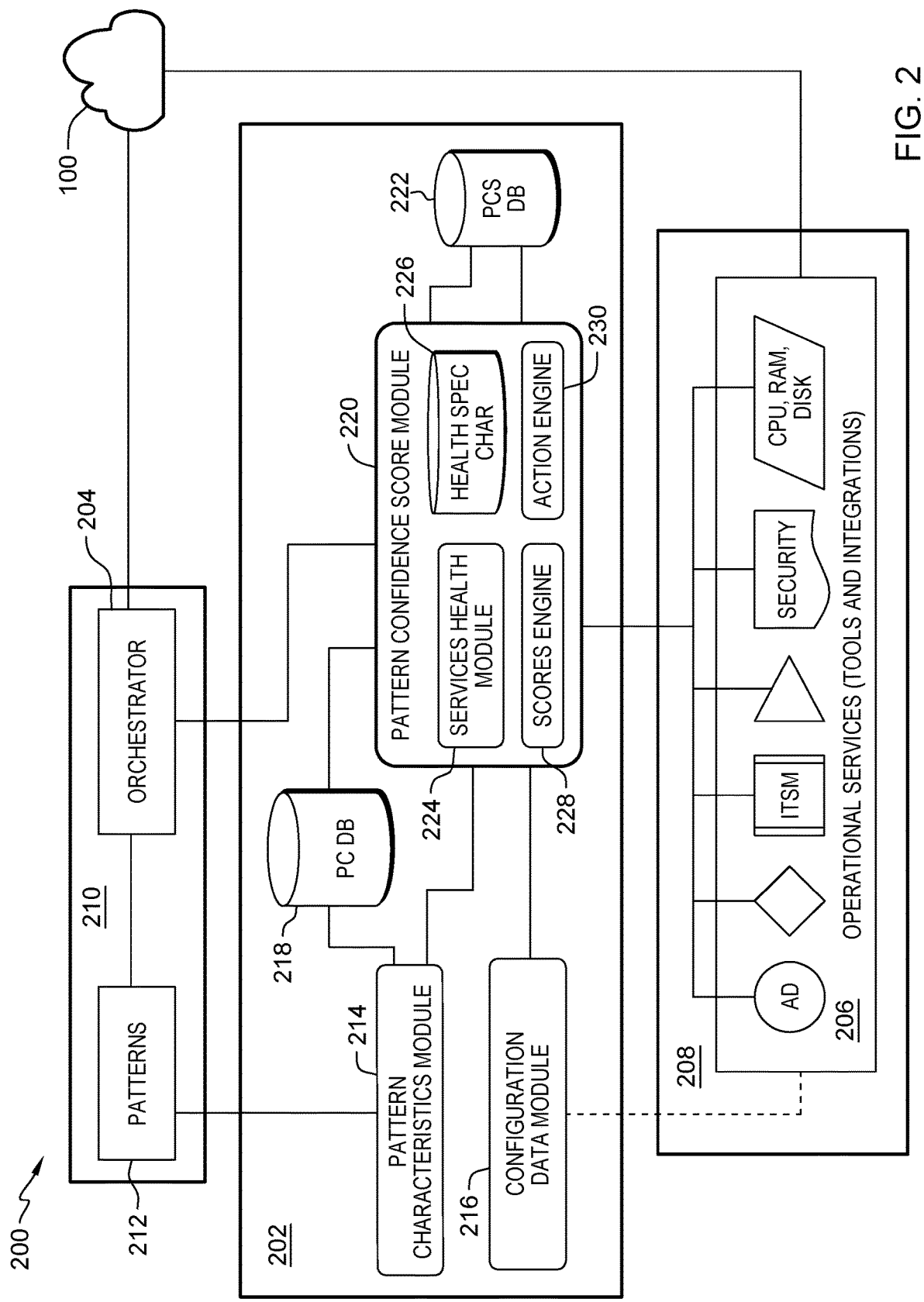
FIG. 2 shows a schematic view of an orchestration service architecture that can prevent deployment failures of IT workloads, in accordance with an embodiment of the present disclosure.

FIG. 2 shows a schematic view of the architecture of computing ecosystem 200, including patterns confidence score ("PCS") engine 202 that can prevent deployment failures of IT devices or workloads. Computing ecosystem 200 can include the same or similar portions of computing environment 100 (shown in FIG. 1), such as orchestrator 204 (which can be the same as or similar to orchestrator 110, shown in FIG. 1) and operation services tools 206 (which can be the same as or similar to operation services tools 116, shown in FIG. 1), and can be connected to or a part of computing environment 100.

In the illustrated embodiment, computing ecosystem 200 comprises PCS engine 202, IT infrastructure components 208, and cloud management platform 210. IT infrastructure components 208 includes operation services tools 206, and cloud management platform 210 includes patterns 212 and orchestrator 204. PCS engine 202 comprises pattern characteristics ("PC") module 214, configuration data module 216, PC database 218, pattern confidence score ("PCS") module 220, and PCS database 222.

PC module 214 determines the characteristics of each pattern 212 available for provisioning, and these characteristics are stored in PC database 218 for each pattern 212. The characteristics data can be used as an input to PCS module 220 and can be represented, for example, as a JavaScript Object Notation ("JSON") schema or a Microsoft Excel ("XLS") spreadsheet. The characteristics can include, for example, the resources to be provisioned, the integrations required during provisioning, and the prerequisite conditions to be satisfied prior to provisioning.

Configuration data module 216 receives configuration data from the entity for which each pattern 212 is provisioned (e.g., user 150, shown in FIG. 1) or from which each pattern 212 originated. This data can be based on business and technical requirements of each of the relevant components (e.g., tools) in computing environment 100. This data is used to set thresholds and weightages for key performance indicators ("KPIs") of the relevant components of computing environment 100 for each pattern 212. The KPI thresholds and weightages can be used as an input to PCS module 220 and can be represented, for example, as a JavaScript Object Notation ("JSON") schema or a Microsoft Excel ("XLS") spreadsheet.

PCS module 220 can determine a confidence score of a selected pattern 212 at the time a provisioning request is made. Such a confidence score can be, for example, between 0.0 and 1.0, wherein the lowest score indicates a high likelihood of failure if the pattern provisioning commences and the highest score indicates the best chances of a successful deployment if pattern provisioning commences. Each time a pattern 212 is attempted to be provisioned, its confidence score and result (e.g., success or failure) can be stored in PCS database 222 to build a historical record.

In the illustrated embodiment, PCS module 220 comprises services health module 224, health specification characteristics ("HSC") database 226, scores engine 228, and action engine 230. Services health module 224 can gather details of all of the components (e.g., hardware, software, services, VMs, devices, modules, etc.) of computing environment 100, as well as details about how the parameters that should be health checked and how often they should be checked. This data can be stored in HSC database 226. Then, services health module 224 can perform the health checks on all of the components of computing environment 100 according to the details in HSC database 226. These health checks can be performed on an ongoing basis, although the health checks of the various parameters can be performed at different intervals. For some examples, a check of the number of available licenses of an operating system may be performed daily, a check of the amount of available memory may be performed every thirty minutes, and a check of the connectivity of a backup server may be performed every five minutes. In alternate embodiments, the health checks are made only in response to a provisioning request. In such embodiments, the health data is as current as possible, although user 150 would have to wait for the health data to be collected prior to finding out whether the requested device can be provisioned or not.

The most recent health data from HSC database 226 can be used along with the configuration data from configuration data module 216 by scores engine 228. Scores engine 228 can determine a confidence score by factoring in only the relevant health data (i.e., the health data related to only the components of computing environment 100 that are used in the given pattern 212).

In addition, the most recent health data from HSC database 226 can be used to detect problems. If problems are found, then action engine 230 can take actions that could remediate the problems. Some examples of remediation actions can be restarting of components of computing environment 100, submitting change or service requests to the administrators or operations team of computing environment 100, and notifying user 150 of the problems.

The confidence score from PCS module 220 can then be used by orchestrator 204 to determine whether or not to move forward with the provisioning of the requested device from self-service catalog 108 (shown in FIG. 1). Thereby, a provisioning that has a low likelihood of success may be prevented from being attempted. This can save a significant amount of time and energy since complex patterns 212 can take, for example, fifteen to one-hundred-and-twenty minutes to complete, as opposed to the less than five minutes to mere seconds that it takes to perform each health check. Furthermore, the historical data in PCS database 222 can be used by PCS module 220 to learn from past provisioning attempts, for example, using trend analysis. This analysis can be used to adjust the thresholds and weightages of KPIs to increase the effectiveness and/or accuracy of the confidence scores given by PCS module 220.

Figure 3:
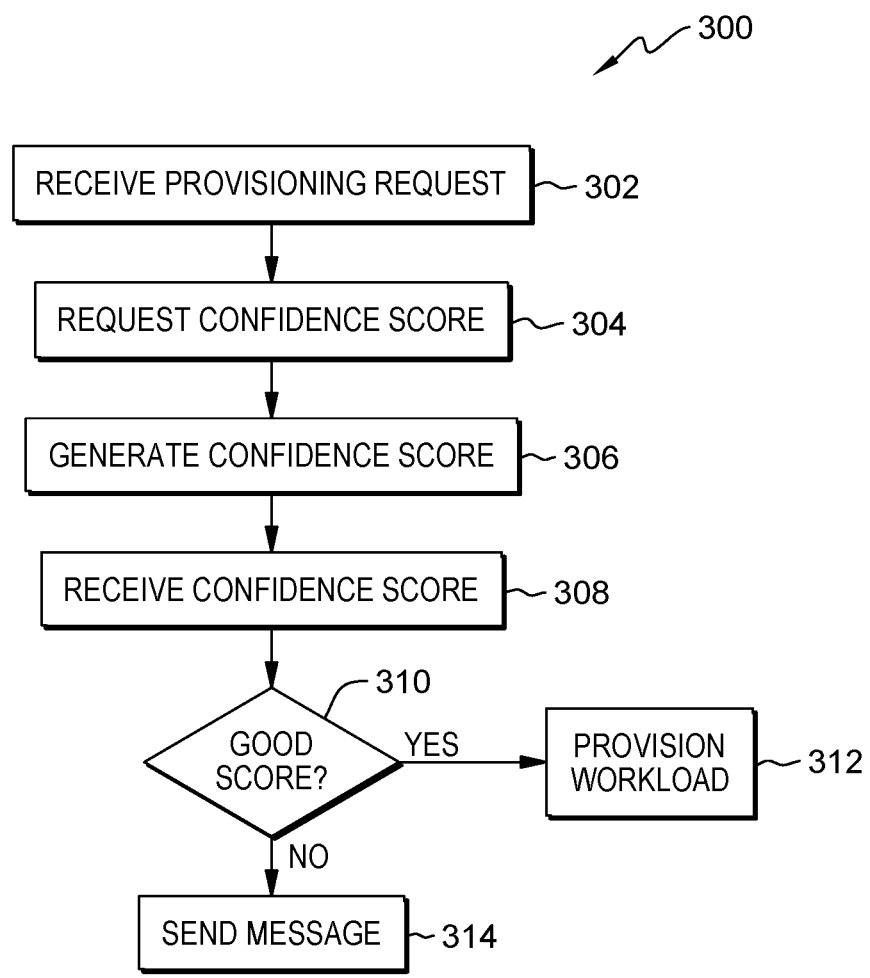
FIG. 3 is a flowchart of determining whether to provision a workload, in accordance with an embodiment of the present disclosure.

FIG. 3 is a flowchart of method 300 for determining whether to provision a workload, for example, by computing ecosystem 200 (shown in FIG. 2). In the discussion of FIG. 3, the features of FIGS. 1 and 2 may be included with their respective reference numerals.

In the illustrated embodiment, at block 302, a request to provision a workload is received from self service catalog 108 by orchestrator 110. At block 304, orchestrator 110 requests a pattern confidence score from PCS engine 202. At block 306, PCS engine 202 generates a confidence score. At block 308, orchestrator 110 receives the confidence score, and at block 310, orchestrator 110 determines whether the confidence score is high enough to proceed with the provisioning of the workload. If so (310=YES), then method 300 moves to block 312 where the workload is provisioned. If not (310=NO), then method 300 moves to block 314 where orchestrator 110 notifies user 150 of the decision to not provision the workload.

Figure 4:
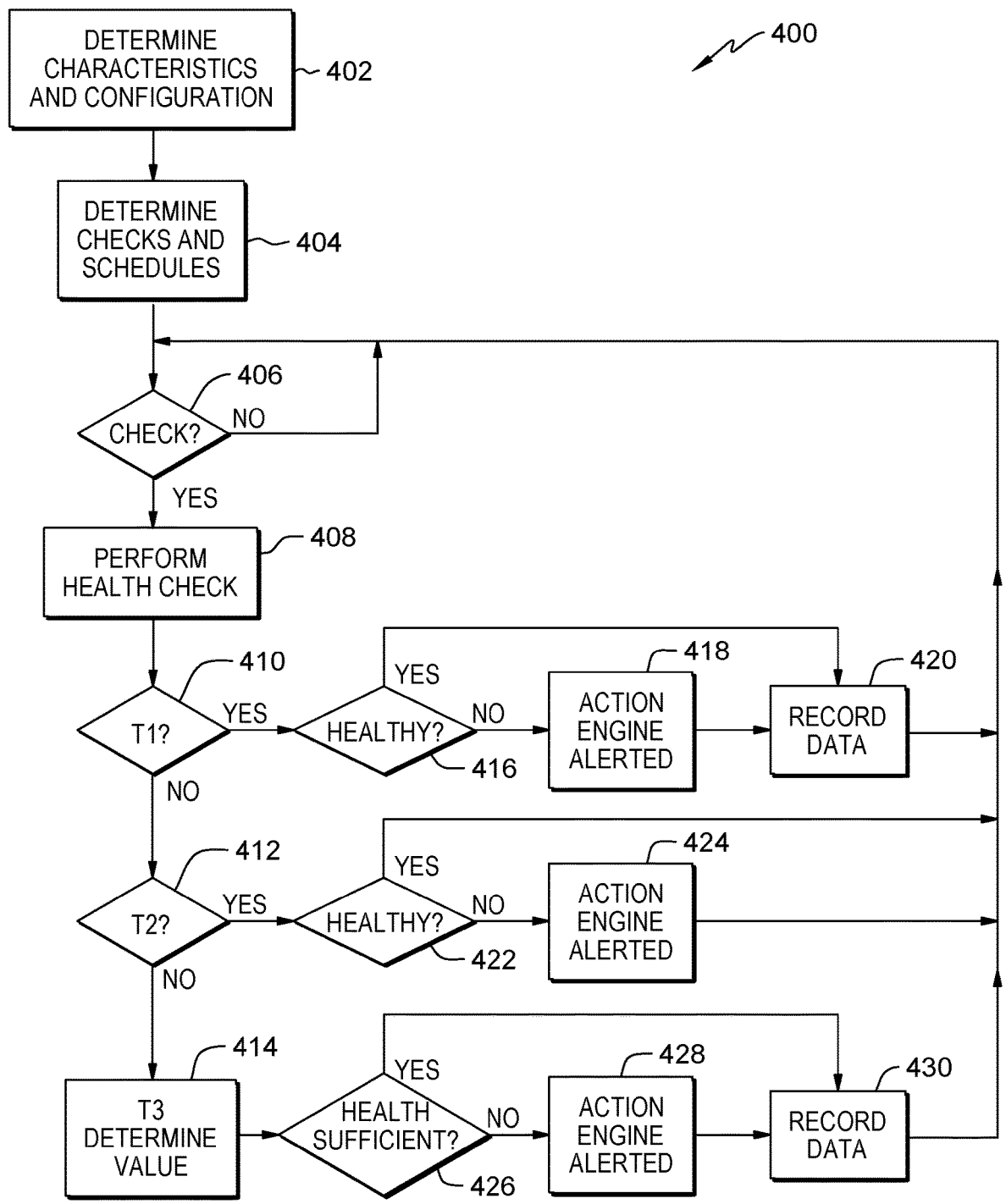
FIG. 4 is a flowchart of initiating and operating a health checking system, in accordance with an embodiment of the present disclosure.

FIG. 4 is a flowchart of method 400 for initiating and operating a health checking system, for example, by computing ecosystem 200 (shown in FIG. 2). In the discussion of FIG. 4, the features of FIGS. 1-3 may be included with their respective reference numerals.

In the illustrated embodiment, at block 402, the characteristics and configuration data of patterns 212 are determined by PC module 214 and configuration data module 216, respectively. At block 404, what parameters of which components of computing environment 100 to health check is determined by services health module 224, along with a schedule of the health checks. At block 406, services health module 224 determines whether it is time to do any of the health checks. If not (406=NO), method 400 returns above block 406 to wait for time to elapse. If so (406=YES), method 400 advances to block 408 where services health module 224 performs the appropriate health check.

At block 410, scores engine 228 receives the results of the health checks and determines whether the checked component is a first-tier element. If not (410=NO), then scores engine 228 determines whether the checked component is a second-tier element at block 412. If not (412=NO), then scores engine 228 determines that the checked component is a third-tier element at block 414. In the illustrated embodiment, a first-tier element is an essential component for a given pattern 212 to be provisioned successfully. A first-tier component can be, for example, monitoring module 140, anti-virus module 146, and backup/recovery module 148. Since all first-tier components of a pattern 212 need to be available for provisioning, the evaluation of first-tier components can be binary (e.g., 0 or 1, "yes" or "no"). This means that they are not factored into the score per se, but if each required first-tier component is healthy, then the provisioning process can proceed. On the other hand, if any of the required first-tier components is unhealthy, then the provisioning process should be halted. A second-tier element is a non-essential component for a given pattern 212 to be provisioned successfully. In other words, the provisioning of a pattern 212 can be successful despite an unhealthy second-tier element. A second-tier component can be, for example, a patch management service that updates the components of computing environment 100. While an unhealthy second-tier element may prohibit the functioning and capabilities of the workload, the fact that it is unhealthy is not a factor in the score or in the decision of whether to proceed with the provisioning. A third-tier element is a component that has a volumetric quality to its health. The health of a third-tier element is a factor in the score and the decision of whether to proceed with the provisioning, but it is not merely a binary quality (e.g., on an eleven-point scale from 0.0 to 1.0). A third-tier component can be, for example, a number of available licenses, a number of available storage units, a number of available processing units, a number of available random-access memory ("RAM") units, and a number of IP addresses available to IPAM module 126.

Returning to method 400, if the checked component is a first-tier element (410=YES), then its health is determined at block 416. If it is not healthy (416=NO), then the unhealthy component is reported to action engine 230 at block 418, and method 400 proceeds to block 420. If it is healthy (416=YES), then method 400 proceeds directly to block 420 where the health value (e.g., 0 or 1) is recorded in HSC database 226. Then method 400 returns above block 406 to see if it is time to perform another health check.

If the checked component is a second-tier element (412=YES), then its health is determined at block 422. If it is not healthy (422=NO), then the unhealthy component is reported to action engine 230 at block 424, and method 400 returns above block 406. If it is healthy (422=YES), then method 400 directly returns above block 406 to see if it is time to perform another health check.

If the checked component is a third-tier element (determined in 414), then the sufficiency of its health is determined at block 426. If it is not sufficiently healthy (426=NO), then the component is reported to action engine 230 at block 428, and method 400 proceeds to block 430. If it is sufficiently healthy (426=YES), then method 400 proceeds directly to block 430 where the health value (e.g., between 0.0 and 1.0) is recorded in HSC database 226. Then method 400 returns above block 406 to see if it is time to perform another health check.

Figure 5:
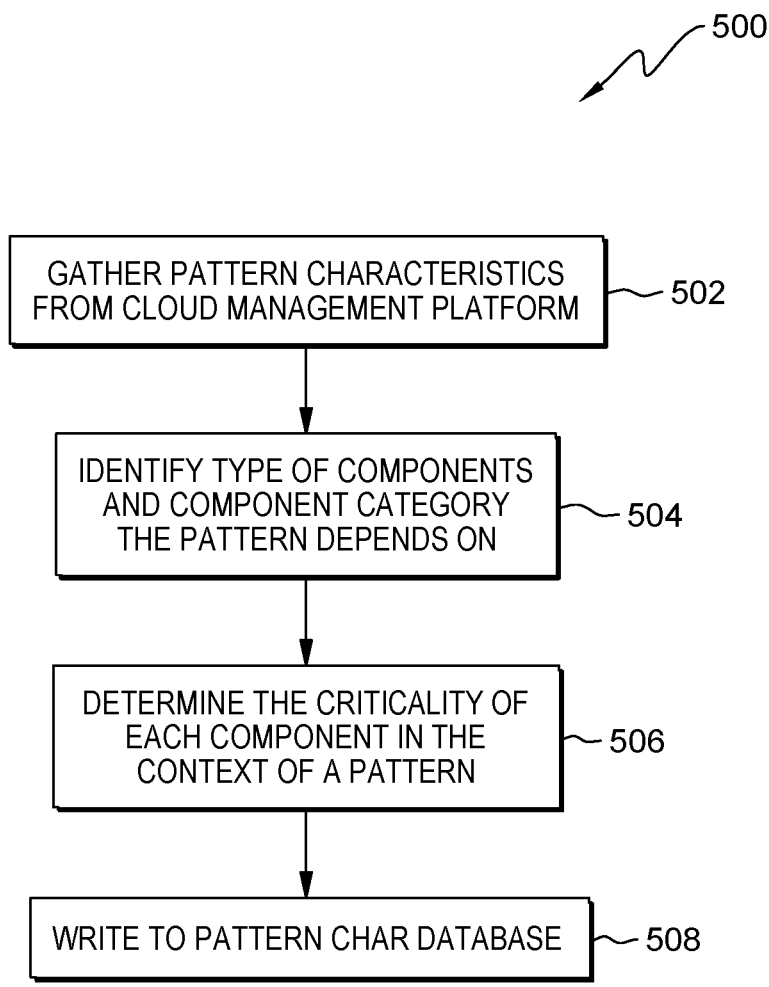
FIG. 5 is a flowchart of determining pattern characteristics, in accordance with an embodiment of the present disclosure.

FIG. 5 is a flowchart of method 500 for determining pattern characteristics, for example, by PC module 214 (shown in FIG. 2). In the discussion of FIG. 5, the features of FIGS. 1-4 may be included with their respective reference numerals.

In the illustrated embodiment, at block 502, the characteristics of patterns 212 are gathered from cloud management platform 210. At block 504, the type and category of components (e.g., e.g., hardware, software, services, VMs, devices, modules, etc.) that each pattern 212 requires for provisioning are determined. At block 506, the criticality of each component (or at least the third-tier components) is determined for each pattern, which can be used subsequently to determine the weightage for each component that is a factor in the score. At block 508, the information from blocks 502-506 are recorded in pattern characteristics database 218.

Figure 6:
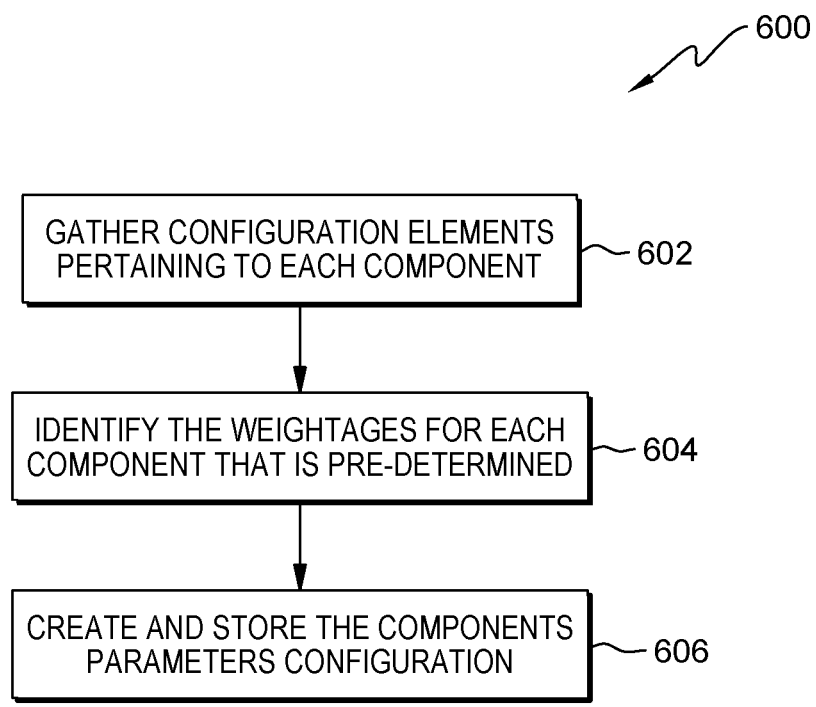
FIG. 6 is a flowchart of configuring provisioning characteristics, in accordance with an embodiment of the present disclosure.

FIG. 6 is a flowchart of method 600 for configuring provisioning characteristics, for example, by configuration data module 216 (shown in FIG. 2). In the discussion of FIG. 6, the features of FIGS. 1-5 may be included with their respective reference numerals.

In the illustrated embodiment, at block 602, the configuration data of operation services tools 206 is received from IT infrastructure components 208. At block 604, configuration data module 216 calculates thresholds and weightages for the KPIs of each component based on the configuration data. At block 606, these sets of thresholds and weightages are stored as service parameters configurations for each component.

Figure 7:
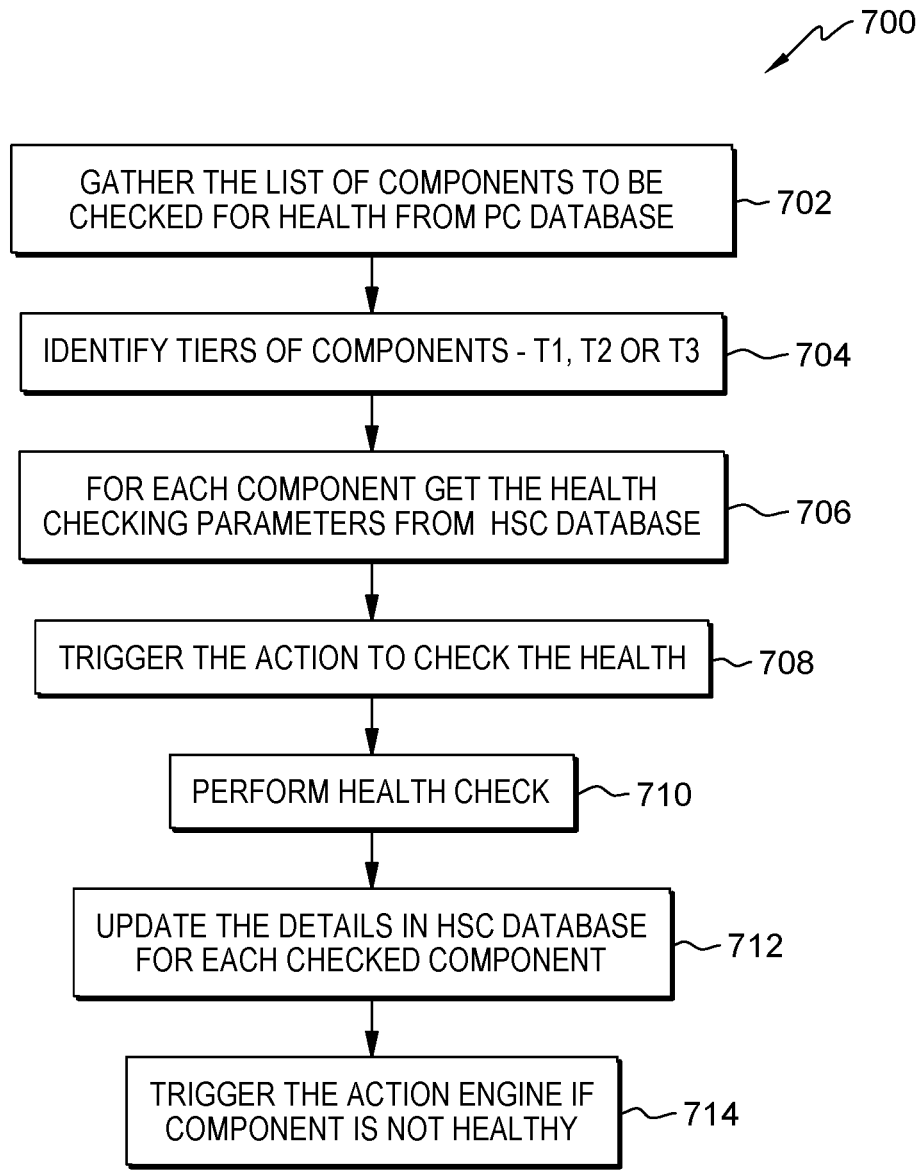
FIG. 7 is a flowchart of performing health checks, in accordance with an embodiment of the present disclosure.

FIG. 7 is a flowchart of method 700 for performing health checks, for example, by services health module 224 (shown in FIG. 2). In the discussion of FIG. 7, the features of FIGS. 1-6 may be included with their respective reference numerals.

In the illustrated embodiment, at block 702, a list of components to be health checked is received from PC database 218. At block 704, the tiers of components are determined (a la blocks 410-414). At block 706, services health module 224 receives the health check parameters and the health checking schedule for all of the components of computing environment 100 from HSC database 226. At block 708, a health check is triggered, for example, chronologically (a la block 406). At block 710, the health check is performed by services health module 224, and the resulting health data is stored in HSC database 226 (a la blocks 420 and 430), if appropriate, at block 712. At block 714, services health module 224 alerts action engine 230 in case any of the health data indicates that the component is unhealthy.

Figure 8:
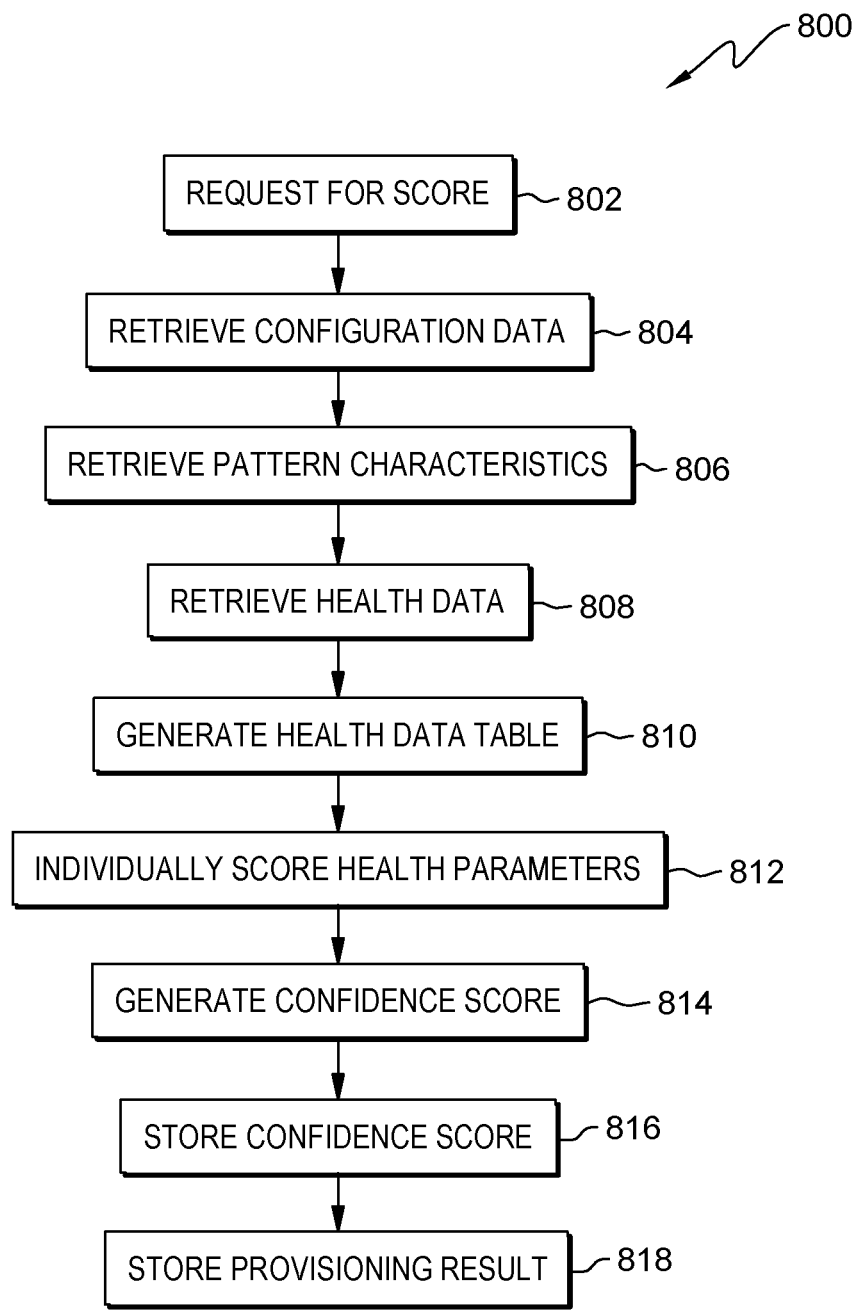
FIG. 8 is a flowchart of scoring health, in accordance with an embodiment of the present disclosure.

FIG. 8 is a flowchart of method 800 for scoring health, for example, by scores engine 228 (shown in FIG. 2). In the discussion of FIG. 8, the features of FIGS. 1-7 may be included with their respective reference numerals.

In the illustrated embodiment, at block 802, scores engine 228 receives a request from orchestrator 204 to generate a confidence score for a given pattern 212. At block 804, scores engine 228 requests and receives the configuration data (including the thresholds and weightages) for the given pattern 212 from 216. At block 806, scores engine 228 requests and receives the characteristics of the given pattern 212 from PC database 218. At block 808, scores engine 228 requests and receives the relevant health data from HSC database 226 with respect to the given pattern 212. At block 810, scores engine 228 generates a health data table. At block 812, scores engine 228 calculates the health score for each component individually. At block 814, scores engine 228 calculates a weighted average of all of the health scores to generate a confidence score. An example of a health data table with health scores and weightages is shown in Table 1:

TABLE 1

| Component | Historic Average | Minimum Threshold | Maximum Threshold | Availability (Point in time) | Health Score | Weightage |
|---|---|---|---|---|---|---|
| IPAM (IP Addresses) | 20 | 20 | 40 | 30 | 0.75 | 100 |
| OS Software Licenses | 20 | 20 | 40 | 60 | 1 | 100 |
| Configuration Management | 20 | 20 | 40 | 100 | 1 | 50 |
| vCPU | 75 | 80 | 160 | 120 | 0.75 | 50 |
| Memory (GB) | 160 | 160 | 240 | 180 | 0.625 | 50 |
| Storage (GB) | 2400 | 2400 | 3000 | 6000 | 1 | 50 |
| ITM Endpoint Registration | 20 | 20 | 40 | 10 | 0.25 | 25 |

Wherein:

The "Historic Average" is calculated once per day and is based on all of the previous days of provisioning.

The "Minimum Threshold" is calculated once per day and is based on a historic average of previous sixty days of provisioning.

The "Maximum Threshold" is calculated once per day by taking the highest ten values from the previous sixty days of provisioning and averaging them.

The "Availability" is calculated at regular intervals during each day, and the latest datapoint can be used when deciding whether to provision.

The "Weightage" is decided for each parameter based on its importance as part of provisioning. Because the weightages can be global comparisons between the various components in computing environment 100, the weightages can add up to a number other than one hundred percent. Any difference can be factored in when calculating the overall confidence score.

The "Health Scores" can be calculated based on the Minimum Threshold, Maximum Threshold, and Availability according to the formulas shown in Table 2:

TABLE 2

| Situation | Possible Score Range | Formula |
|---|---|---|
| Availability is less than Minimum Threshold | Score between 0.0 and 0.5 | Avail./(Min. Thr. * 2) |
| Availability is between Minimum and Maximum Threshold | Score between 0.5 and 1.0 | 0.5 + ((Avail. − Min. Thr.)/((Max. Thr. − Min. Thr.) * 2)) |

TABLE 2-continued

| Situation | Possible Score Range | Formula |
|---|---|---|
| Availability is greater than Maximum Threshold | Score = 1 | Score = 1 |

As shown in Table 2, when the Availability is at the Minimum Threshold, then the health score will be 0.5, and when the Availability is at the Maximum Threshold, then the health score will be 1.0. In addition, in order to prevent an abundance of one factor from skewing the confidence score upwards, the health score will be 1.0 when the Availability is above the Maximum Threshold.

To calculate the overall confidence score for a given provisioning at a given time, each health score is multiplied by each weightage to created weighted scores. These weighted scores are then added together and divided by the total sum of all of the weightage values for the given provisioning. Thereby, in the example shown in Table 1, the confidence score would be 0.82, which could indicate that the given provisioning would likely be successful.

At block 816, the confidence score is stored in PCS database 222 and it is also sent to orchestrator 204. If orchestrator 204 decides to proceed with the provisioning of the given pattern 212 based on the confidence score, then, at block 818, the result of the provisioning (e.g., success or failure) can be stored in PCS database 222 and associated with the confidence score from block 816. Thereby, the data in PCS database 22 can be used for machine learning to increase the usefulness of the confidence scores. For example, the configuration data (e.g., thresholds and weightages) of configuration data module 216 and/or the pattern characteristics of PC database 218 can be adjusted by orchestrator 204 and/or scores engine 228.

Figure 9:
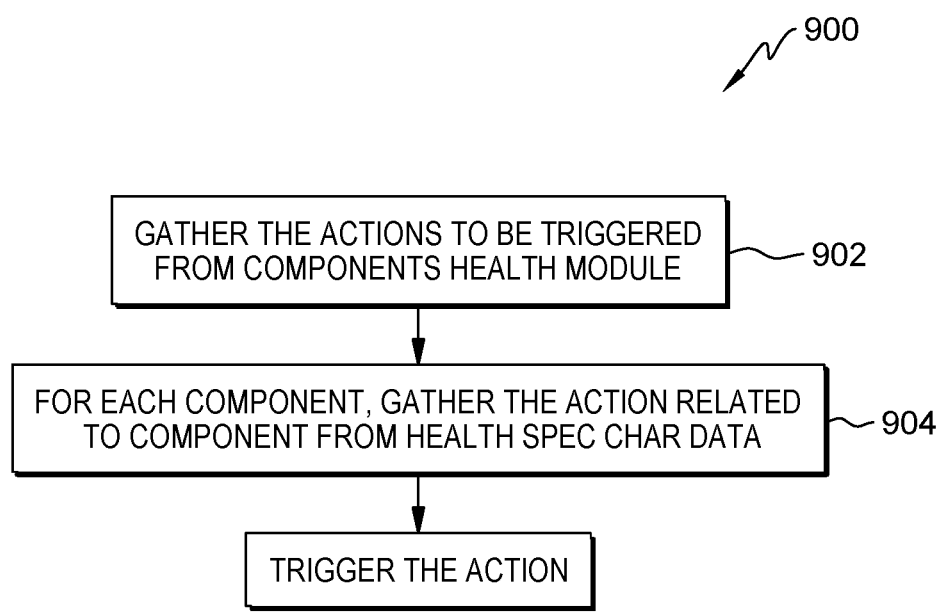
FIG. 9 is a flowchart of the operation of an action engine, in accordance with an embodiment of the present disclosure.

FIG. 9 is a flowchart of method 900 for the operation of an action engine, for example, action engine 230 (shown in FIG. 2). In the discussion of FIG. 9, the features of FIGS. 1-8 may be included with their respective reference numerals.

In the illustrated embodiment, at block 902, action engine 230 receives a notification from health services module 224 that a component is unhealthy. At block 904, action engine 230 retrieves the unhealthy data from HSC database 226. At block 906, a remediation action is performed by action engine 230, wherein the remediation action can comprise, for example, restarting of components of computing environment 100, submitting change or service requests to the administrators or operations team of computing environment 100, and notifying user 150 of the issue.

Figure 10:
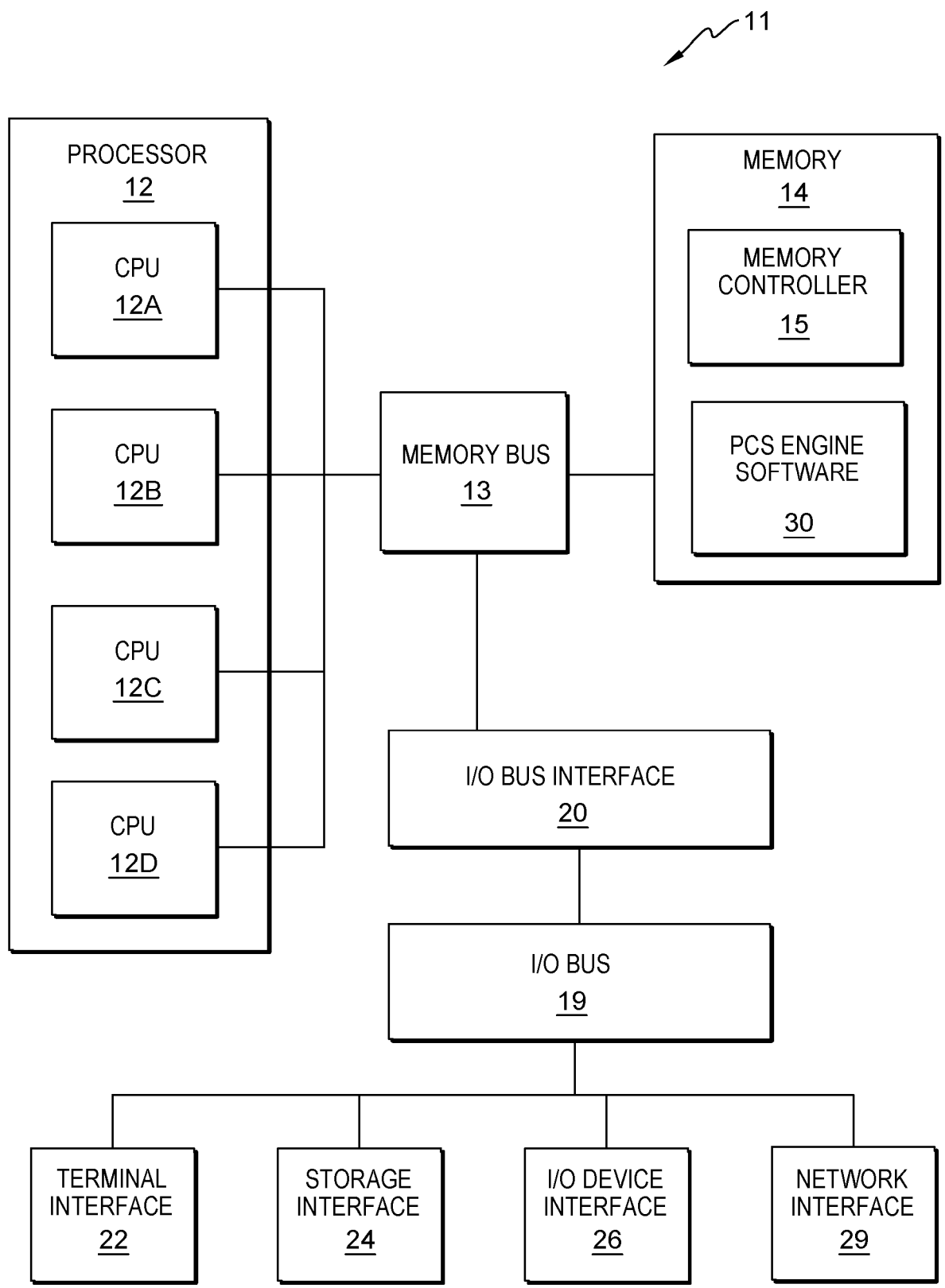
FIG. 10 shows a high-level block diagram of an example computer system that can be used in implementing embodiments of the present disclosure.

Referring now to FIG. 10, shown is a high-level block diagram of an example computer system (i.e., computer) 11 that may be used in implementing one or more of the methods or modules, and any related functions or operations, described herein (e.g., using one or more processor circuits or computer processors of the computer), in accordance with embodiments of the present disclosure. For example, computer system 11 can be used for any of the modules, servers, and engines shown in FIGS. 1 and 2 if appropriate. In some embodiments, the components of the computer system 11 may comprise one or more CPUs 12, a memory subsystem 14, a terminal interface 22, a storage interface 24, an I/O (Input/Output) device interface 26, and a network interface 29, all of which may be communicatively coupled, directly or indirectly, for inter-component communication via a memory bus 13, an I/O bus 19, and an I/O bus interface unit 20.

The computer system 11 may contain one or more general-purpose programmable central processing units (CPUs) 12A, 12B, 12C, and 12D, herein generically referred to as the processer 12. In some embodiments, the computer system 11 may contain multiple processors typical of a relatively large system; however, in other embodiments the computer system 11 may alternatively be a single CPU system. Each CPU 12 may execute instructions stored in the memory subsystem 14 and may comprise one or more levels of on-board cache.

In some embodiments, the memory subsystem 14 may comprise a random-access semiconductor memory, storage device, or storage medium (either volatile or non-volatile) for storing data and programs. In some embodiments, the memory subsystem 14 may represent the entire virtual memory of the computer system 11 and may also include the virtual memory of other computer systems coupled to the computer system 11 or connected via a network. The memory subsystem 14 may be conceptually a single monolithic entity, but, in some embodiments, the memory subsystem 14 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 14 may contain elements for control and flow of memory used by the processor 12. This may include a memory controller 15.

Although the memory bus 13 is shown in FIG. 10 as a single bus structure providing a direct communication path among the CPUs 12, the memory subsystem 14, and the I/O bus interface 20, the memory bus 13 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 20 and the I/O bus 19 are shown as single respective units, the computer system 11 may, in some embodiments, contain multiple I/O bus interface units 20, multiple I/O buses 19, or both. Further, while multiple I/O interface units are shown, which separate the I/O bus 19 from various communications paths running to the various I/O devices, in other embodiments some or all of the I/O devices may be connected directly to one or more system I/O buses.

In some embodiments, the computer system 11 may be a multi-user mainframe computer system, a single-user system, or a server computer or similar device that has little or no direct user interface but receives requests from other computer systems (clients). Further, in some embodiments, the computer system 11 may be implemented as a desktop computer, portable computer, laptop or notebook computer, tablet computer, pocket computer, telephone, smart phone, mobile device, or any other appropriate type of electronic device.

In the illustrated embodiment, memory subsystem 14 further includes PCS engine software 30. The execution of PCS engine software 30 enables computer system 11 to perform one or more of the functions described above in evaluating and provisioning patterns (for example, the blocks shown in FIGS. 3-9).

It is noted that FIG. 10 is intended to depict representative components of an exemplary computer system 11. In some embodiments, however, individual components may have greater or lesser complexity than as represented in FIG. 10, components other than or in addition to those shown in FIG. 10 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
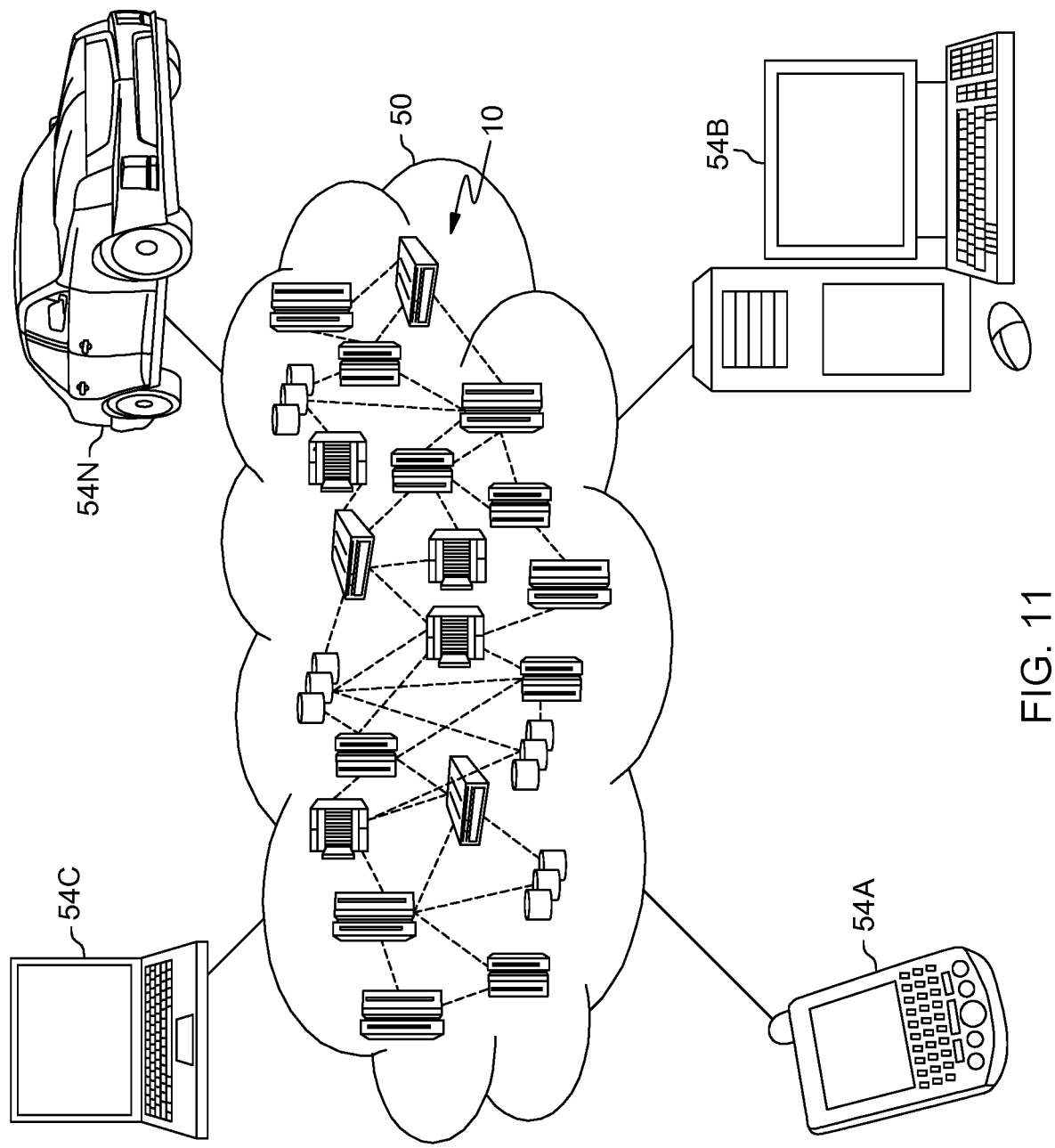
FIG. 11 shows a cloud computing environment, in accordance with an embodiment of the present disclosure.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
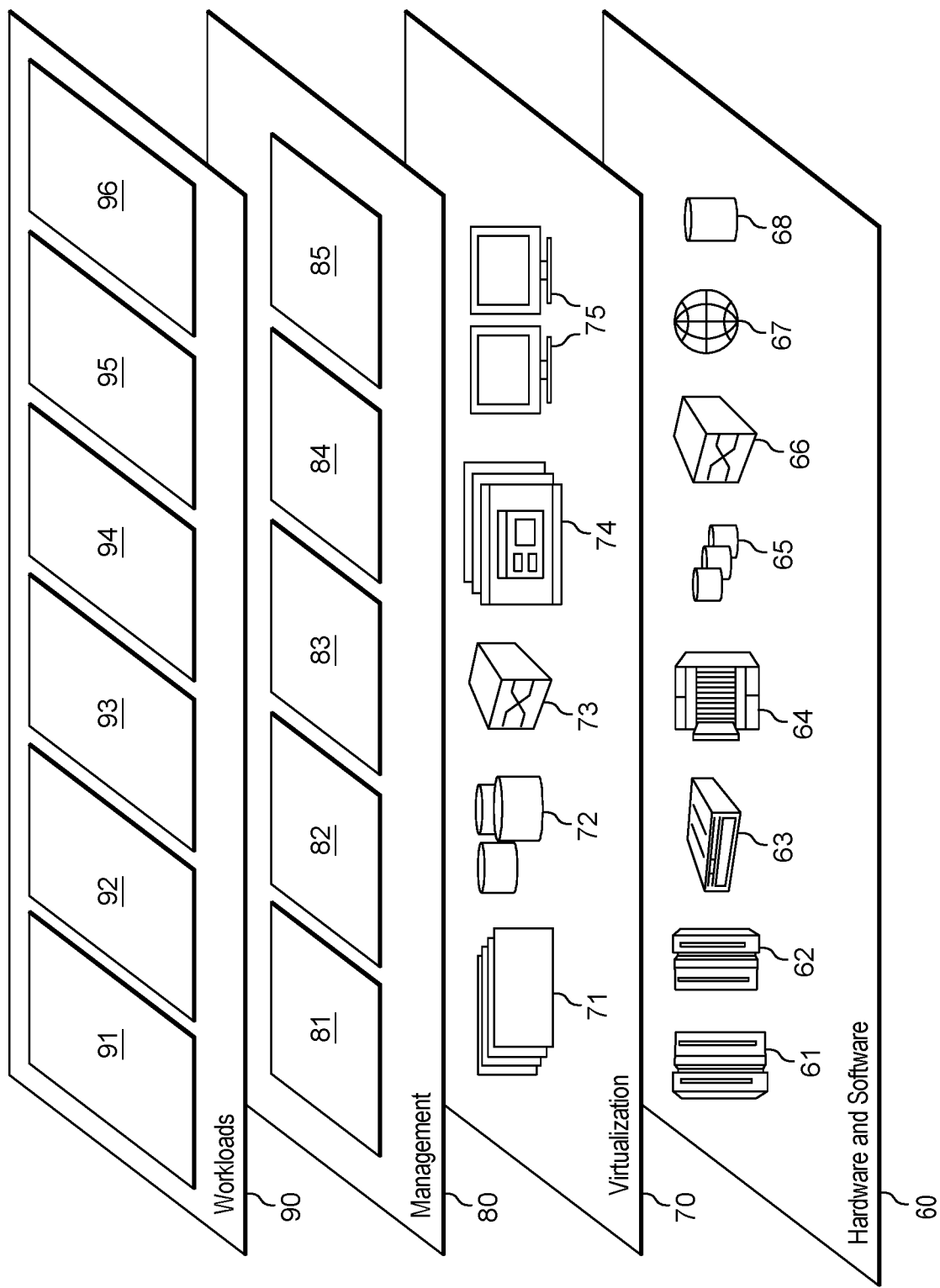
FIG. 12 shows abstraction model layers, in accordance with an embodiment of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. s depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and PCS engine 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for orchestrating a provisioning of a computer workload, the method comprising:
 determining characteristics of a computing pattern;
 determining health data of a computing environment based on the characteristics of the computing pattern;
 determining a confidence score based on the health data;
 provisioning the computer workload in a computing infrastructure based on the confidence score being above a predetermined threshold; and
 executing the computer workload in the computing infrastructure,
 wherein each characteristic is related to one of a plurality of components of the computing environment, and further comprising: categorizing at least some of the components of the computing environment into a plurality of tiers, and wherein the confidence score is based on the health data of only one of the plurality of tiers.

2. The method of claim 1, further comprising:
 determining configuration data including thresholds and weightages for key performance indicators.

3. The method of claim 1, wherein the health data represents a plurality of parameters and wherein determining the confidence score comprises:
 scoring each of the plurality of parameters individually; and
 determining a weighted average of the scoring of each of the plurality of parameters.

4. The method of claim 1, wherein the one of the plurality of tiers is defined by having a volumetric quality to its health data.

5. The method of claim 4, wherein another one of the plurality of tiers is defined by having a binary quality to its health data.

6. The method of claim 1, further comprising:
 generating a notification if any of the health data indicates an unhealthy component of the computing environment.

7. The method of claim 1, further comprising using operation services tools with the provisioned computer workload during use of the computer workload.

8. The method of claim 1, further comprising:
 receiving a selected device from a self-service catalog, which is a list of devices from a cloud infrastructure that can be provisioned for consumption of the user;
 once the device is selected, receiving a provisioning request from the self-service catalog; and
 using automated logic in conjunction with a cloud infrastructure and integration tools, provisioning the selected device and placing the selected device it in multi-tier servers for use with the operation services tools during its consumption by the user.

9. A method for generating a confidence score for a provisioning a computer workload, the method comprising:
 receiving heath parameters of components in a computing environment to monitor;
 receiving threshold and weightage data related to the health parameters; checking the health parameters to gather health data;
 storing the health data in a database;
 receiving a request for a confidence score;
 retrieving the health data in response to receiving the request for the confidence score;
 scoring each element of the health data individually using the threshold and weightage data;
 generating an overall confidence score based on the scoring of each element of the health data;
 provisioning the computer workload within multi-tier servers based on the overall confidence score being above a predetermined threshold;
 executing the computer workload within the multi-tier servers;
 maintaining historical records of past provisionings, including confidence scores and successes/failures of the past provisionings; and
 using the historical records to teach the patterns confidence score module to increase accuracy.

10. The method of claim 9, wherein using the historical records comprises:
 changing the threshold and weightage data with respect to at least one health parameter.

11. The method of claim 9, wherein generating the overall confidence score comprises:
 averaging, weightedly, scores of each element of the health data.

12. The method of claim 9, further comprising:
- receiving a selected device from a self-service catalog, which is a list of devices from a cloud infrastructure that can be provisioned for consumption of the user;
- once the device is selected, receiving a provisioning request from the self-service catalog;
- using automated logic in conjunction with the cloud infrastructure and integration tools, provisioning the selected device and placing the selected device in the multi-tier servers for use with operation services tools during its consumption by the user.

13. A system for provisioning a computer workload, the system comprising:
- a processing unit; and
- a memory coupled to the processing unit and storing instructions thereon, the instructions, when executed by the processing unit, implement:
- an orchestrator module that is configured to use a computer pattern to provision the computer workload in a computing environment;
- a pattern characteristics module that is configured to determine which characteristics of the computing environment are relevant to the computer workload;
- a configuration data module that includes threshold and weightage data of the characteristics that are relevant to the computer workload; and
- a pattern confidence score module that is configured to calculate a confidence score based on a health of the computing environment and the threshold and weightage data with respect to the characteristics that are relevant to the computer workload;
- wherein the orchestrator module performs the provisioning of the computer workload based on the pattern confidence score and executing the computer workload in the computing environment.

14. The system of claim 13, further comprising:
- a pattern confidence score database that is configured to maintain a historical record for past pattern provisionings including their respective confidence scores and whether the past pattern provisionings were successes or failures.

15. The system of claim 14, wherein the pattern confidence score database is configured to be used to teach the configuration data module to improve accuracy of the system for provisioning computer workloads.

16. The system of claim 13, wherein the computer workload is one of a plurality of computer workloads available for selection in a self-service catalog accessible by a user.

17. The system of claim 13, wherein the pattern confidence score module comprises: a health module configured to analyze health of components in the computing environment.

18. The system of claim 17, wherein the pattern confidence score module comprises:
- a scores engine configured to calculate the confidence score.

19. The system of claim 18, wherein the pattern confidence score module comprises:
- an action engine configured to generate a notification if any of the components in the computing environment are unhealthy.

20. The system of claim 13, wherein the pattern confidence score module is configured to calculate the confidence score by calculating a health score for each of the characteristics that are relevant to the computer workload.

21. The system of claim 13, wherein:
- the orchestrator module is further configured to preempt conditions that result in a deployment failure of the computer pattern and intelligently perform orchestration steps based on the pattern characteristics; and
- a module configured to identify the pattern characteristics and gather insights from heterogeneous data source systems and services of the computing environment that hold operational data related to functioning of relevant services.

* * * * *